United States Patent

Yamamoto et al.

[11] 4,102,217
[45] Jul. 25, 1978

[54] SUPPORT ASSEMBLY OF A COLLAPSIBLE STEERING COLUMN

[75] Inventors: Yoshimi Yamamoto, Shizuoka; Kazuo Ikawa; Naoki Ogawa, both of Yokohama, all of Japan

[73] Assignees: Nissan Motor Company, Ltd.; Fuji Kiko Company, Ltd., both of Japan

[21] Appl. No.: 758,405

[22] Filed: Jan. 11, 1977

[30] Foreign Application Priority Data

Jan. 13, 1976 [JP] Japan .............................. 51-1792[U]

[51] Int. Cl.² .............................................. B62D 1/16
[52] U.S. Cl. .................................... 74/492; 188/1 C; 280/777
[58] Field of Search ................ 74/492, 493; 280/777, 280/779, 780; 180/78; 188/1 C; 248/223.2, 224.4, 225.1, 229.2

[56] References Cited

U.S. PATENT DOCUMENTS

| | | | |
|---|---|---|---|
| 3,747,427 | 7/1973 | Milton | 74/492 |
| 3,805,636 | 4/1974 | Howes | 74/492 |
| 3,813,960 | 6/1974 | Windett | 74/492 |
| 3,944,244 | 3/1976 | Albrecht | 280/777 |

FOREIGN PATENT DOCUMENTS 2,365,063  9/1973  Fed. Rep. of Germany ......... 74/492

*Primary Examiner*—N. P. Godici

[57] ABSTRACT

A flat clamp plate is fastened to an instrument panel of a vehicle body. A clamp attachment with a top panel is fixed to a telescopically movable part of the steering column and is in slidable engagement with the clamp plate through a hook connection at the front and rear ends thereof. The clamp plate and the clamp attachment are fastened together by means of shear pins which are breakable under a predetermined shearing stress.

3 Claims, 10 Drawing Figures

SUPPORT ASSEMBLY OF A COLLAPSIBLE STEERING COLUMN

This invention relates in general to a collapsible safety steering column and more particularly to an improved support assembly of the collapsible steering column to support the steering column normally in a non-collapsed position.

It is well established that present day automotive safety requirements compel the steering column of the automobile to be collapsible so that in the event of a collision the driver will not be killed or seriously injured by impact with the steering wheel and associated steering column.

A primary object of this invention is to provide an improved support assembly which collapsibly mounts the steering column to a fixed part of the vehicle body.

Another object of this invention is to provide an improved support assembly of the character mentioned above which itself is broken by a predetermined impact force during collision of the vehicle to ensure dependable collapsing of the steering column.

Yet another object of this invention is economical manufacture and easy mounting of such steering column support assembly to the vehicle body.

Various other objects and features which characterize the invention will be apparent and pointed out in the following detailed description and particularly in the claims annexed to, reference being made to the accompanying drawings, in which:

Figure 1:
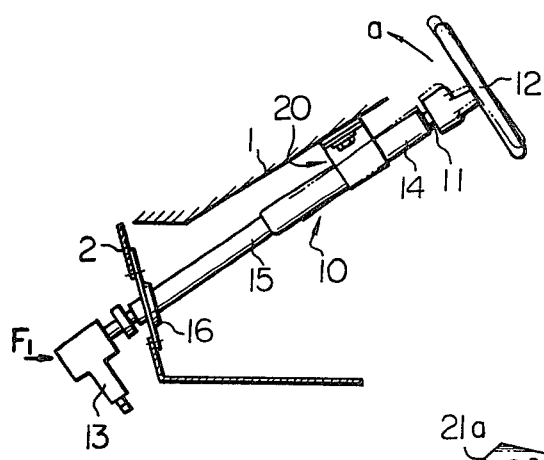
FIG. 1 is a schematic elevation illustrating a steering column arrangement with a prior art support assembly.
Figure 2:
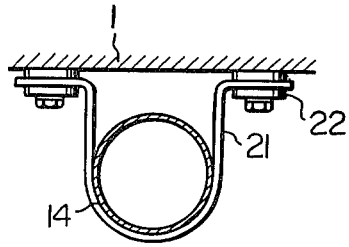
FIG. 2 is a front elevation of the support assembly shown in FIG. 1.
Figure 3:
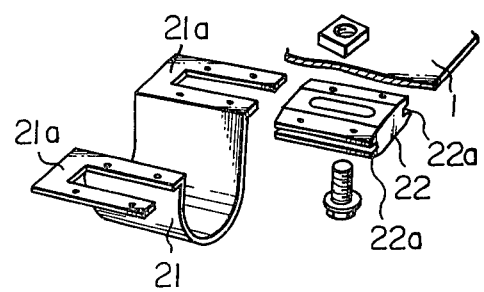
FIG. 3 is a fragmentary perspective view of individual elements of the support assembly shown in FIG. 1.
Figure 4:
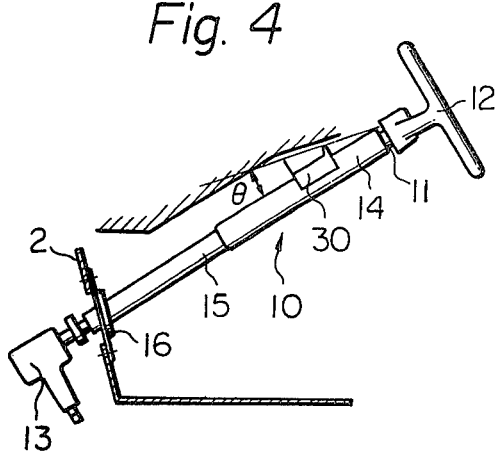
FIG. 4 is a schematic elevation of the support assembly according to this invention.
Figure 5:
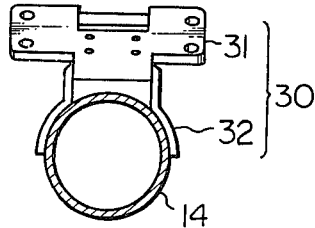
FIG. 5 is a front elevation of the support assembly shown in FIG. 4.

In FIGS. 1 to 3, the prior art support assembly is exemplarily shown for comparison with the construction according to this invention. The steering column assembly 10 conventionally comprises a steering shaft 11, which at its upper end carries a steering wheel 12 and at the opposite lower end is operatively connected with the steering gearbox 13. The steering shaft 11 is enclosed by an upper outer jacket 14 and a lower inner jacket 15 which are in telescopic relationship with each other. While the upper jacket is fastened to an instrument panel 1 by means of a support assembly 20 as will be hereinafter described, the lower inner jacket 15 is at its lower end fixed to a dashboard 2 by means of a suitable bracket 16.

The typical prior art support assembly 20 is shown in FIGS. 2 and 3 and comprises a U-shaped clamp member 21 which fixedly surrounds a portion of the upper jacket 14 and has two wings or flanges 21a integrally extending outwardly from the upper ends of the clamp member 21. A pair of spaced I-section slideways 22 are securely bolted to the instrument panel 1 above the clamp member 21. Each of the wings of the clamp member is formed with an elongate rectangular notch (no numeral) which is engaged with grooves 22a of each said I-section slideway. The wing and the slideway are combined together by means of a plurality of shear pins (not shown).

The support assembly as above is arranged to permit the collapse of the steering column by breaking the shear pins under a predetermined shearing stress exerted by the inertia of the driver's body thrown against the steering wheel.

In practice, however, it is unlikely that the steering column with the support assembly of the construction referred to could successfully collapse for the reason as will be set forth below. When the vehicle body front collides with a solid obstacle, the impact force applied in the direction $F_1$ (FIG. 1) thrusts the gearbox 13 rearwardly tending to plunge it into the driver's compartment of the vehicle. As a result, the bracket 16 fastened to the dash panel is broken and accordingly the whole steering column 10 tends to shift rearwardly. However since the steering column is fastened to the instrument panel 1 by means of the support assembly, the steering column is slightly tilted above the support assembly as indicated by a phantom line in FIG. 1. This causes an undesirable distorsion or deformation of the clamp member 21 at the area engaging the slideway 22. The thus distorted clamp member 21 can not smoothly slide off the slideway and therefore will prevent telescopic movement of the upper jacket 14 over the lower jacket 15 in spite of the inertia force of the driver's body collided with the steering wheel.

It can also be pointed out that the I-section slideway must be manufactured by a relatively expensive method such as diecasting of zinc alloy.

The improved support assembly according to this invention eliminates or alleviates these drawbacks and shortcomings, in a manner as will be hereinafter explained with reference to FIGS. 4 to 10. The arrangement of the steering column 10 is identical with that shown in FIG. 1 for convenience of explanation. As is best seen in FIG. 7, the support assembly 30 essentially consists of a clamp plate 31 extending in the longitudinal direction of the steering column and an inverted channel section clamp attachment 32 welded or otherwise fixed to the upper jacket of the steering column. The clamp plate 31 has a longitudinal front end formed with a rectangular cutaway 31a and a longitudinal area end with a downwardly directed, hook-shaped extension 31b. A plurality of holes 31c for inserting shear pins or rivets 33 are formed at the center area of the clamp plate. The clamp plate 31 has also a plurality of holes 31d through which bolts (not shown) are passed to fasten the plate 31 to the instrument panel 1.

The clamp attachment 32 has a top panel 32b, the plane of which is inclined by an angle $\theta$ with respect to a plane containing any longitudinal transverse section of the upper jacket for a reason to be later described. The top panel 32b is formed at its front end an upwardly directed, hook-shaped extension 32a engageable with the cutaway 31a of the plate 31. Holes 32c are formed through the top plate 32b the number and positions corresponding to those of the holes 31c at the plate 31.

It may be noted that the instrument panel 1 is partially recessed to loosely receive the extension 32a so that other portion of the clamp plate 31 tightly contacts and is fastened to the surface of the instrument panel 1, though not clearly shown.

Figure 6:
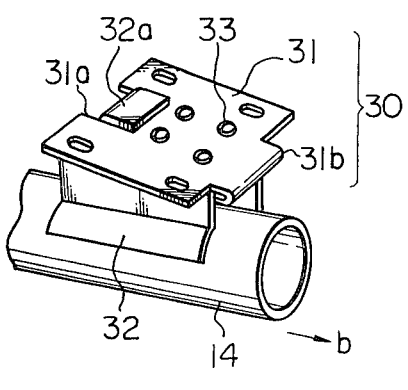
FIG. 6 is a detailed perspective view of the support assembly of this invention in an assembled condition.
Figure 7:
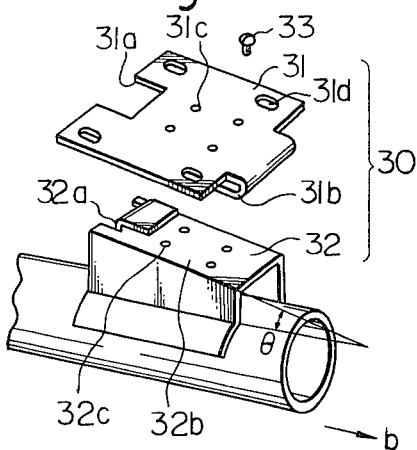
FIG. 7 is a detailed perspective view of the support assembly of this invention in a disassembled condition.

During assembly the hook-shaped extension 31b of the clamp plate 31 is hooked on the rear end of the top panel 32b, while the extension 32a of the top panel is hooked on the cutaway 31a of the plate 31 as in FIG. 6. The plate 31 and the panel 32b are then fastened together by means of the shear pins or rivets 33 passed through the holes 31c and 32c. The support assembly thus assembled is mounted to the instrument panel 1 by bolting the clamp plate 31 thereto.

Figure 8:
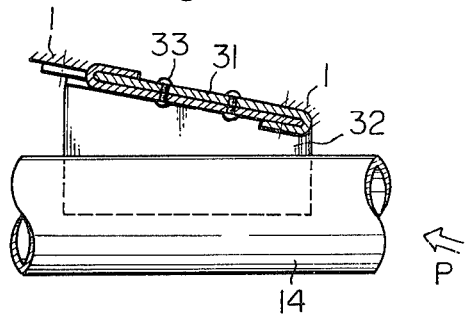
FIG. 8 is a longitudinal section of the support assembly of this invention in a normal operating condition of the vehicle.
Figure 9:
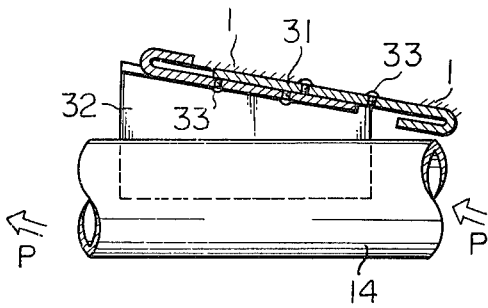
FIG. 9 is a view similar to FIG. 8 showing a condition during a collision of the vehicle.

In operation, the clamp plate 31 and the clamp attachment 32 are kept engaged as shown in FIG. 8 in a normal driving condition. When the impact force P is applied to the steering column due to the inertia of the driver's body thrown forward against the steering wheel during collision of the vehicle, the rivets 33 are broken by a preset shearing stress resulting from the impact force P and the clamp attachment 32 together with the upper jacket 14 slides along the clamp plate 31 forwardly with respect to the clamp plate. To facilitate this slide movement, the top panel 32b is inclined by the aforementioned angle $\theta$ to be parallel with the direction of the impact force P. The entire steering column is thus collapsed for safety of the driver.

From the foregoing, it will be readily understood that the clamp plate and the top panel of the clamp attachment are in face-to-face contact with each other throughout a wider area than in the prior art support assembly as previously described. The impact force tending to rearwardly upwardly displace the steering column during the incipient collision is distributed throughout this wider area without being locally concentrated, and therefore would not cause an appreciable distortion or deformation of the support assembly which probably might prevent a successful collapsion of the steering column. Besides, the hook-shaped extensions being engaged with the corresponding ends of the mating elements will particularly prevent an upward distorsion or bending of the clamp attachment.

It may also be pointed out that lateral displacement of the clamp plate and the clamp attachment is prevented particularly by hook engagement of the extension 32a with the cutaway 31a. Furthermore, each of the clamp plate and attachment can be simply and economically manufactured by suitably bending a single plate of steel or other material.

Figure 10:
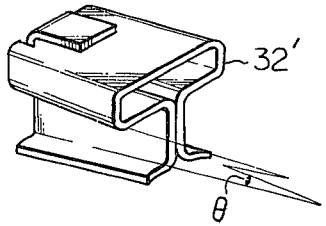
FIG. 10 is a perspective view showing a design alternative of the element of the support assembly according to this invention.

While in the foregoing there has been shown and described the preferred embodiment of the invention, it is to be understood that minor changes in the details of construction and arrangements of parts may be resorted to without departing from the spirit and scope of the invention. For instance, the channel-section attachment may be replaced by I-section member 32' as shown in FIG. 10.

We claim:

1. In an automotive collapsible steering column assembly with a telescopically movable portion, the combination comprising, a clamp attachment fixed to the telescopically movable portion of the steering column and having a top panel extending in the longitudinal direction of the steering column, said top panel including one longitudinal end formed with an upwardly directed, hook-shaped extension and an opposite longitudinal end, a clamp plate secured to a part of the vehicle body and being laid upon said top panel in slidable engagement therewith, said clamp plate having one longitudinal end formed with a downwardly directed, hook-shaped extension engageable with the opposite end of said top panel and an opposite longitudinal end, said clamp plate having means for preventing lateral displacement of the clamp plate with respect to the clamp attachment, means for combining said clamp plate and said top panel of the clamp attachment together, said means being breakable under a predetermined impact force applied thereto to permit said clamp attachment to slide off said clamp plate.

2. The combination according to claim 1, in which said means for lateral displacement comprises a cutaway portion engageable with said hook-shaped extension of the top panel.

3. The combination according to claim 1, in which said top panel of the clamp attachment is inclined at a predetermined angle with respect to a plane containing a longitudinal transverse section of the steering column to be parallel with the direction of the impact force.

* * * * *